(12) United States Patent
Koike et al.

(10) Patent No.: US 9,095,163 B2
(45) Date of Patent: Aug. 4, 2015

(54) PACKED SOY SAUCE-CONTAINING LIQUID SEASONING

(75) Inventors: Shin Koike, Tokyo (JP); Yuki Kaneko, Tokyo (JP); Shigemi Tsuchiya, Tokyo (JP); Jun Kohori, Tokyo (JP)

(73) Assignee: Kao Corporation, Tokyo (JP)

( * ) Notice: Subject to any disclaimer, the term of this patent is extended or adjusted under 35 U.S.C. 154(b) by 141 days.

(21) Appl. No.: 13/382,748

(22) PCT Filed: Jul. 14, 2010

(86) PCT No.: PCT/JP2010/062280
§ 371 (c)(1),
(2), (4) Date: Jan. 6, 2012

(87) PCT Pub. No.: WO2011/007892
PCT Pub. Date: Jan. 20, 2011

(65) Prior Publication Data
US 2012/0107481 A1 May 3, 2012

(30) Foreign Application Priority Data
Jul. 15, 2009 (JP) ................. 2009-166322

(51) Int. Cl.
*A23L 1/238* (2006.01)
(52) U.S. Cl.
CPC ..................... *A23L 1/238* (2013.01)
(58) Field of Classification Search
CPC ...................................... A23L 1/238
USPC .................................. 426/46, 589
See application file for complete search history.

(56) References Cited

U.S. PATENT DOCUMENTS

2010/0075017 A1  3/2010 Nishimura et al.

FOREIGN PATENT DOCUMENTS

| CA | 1 236 334 | 5/1988 |
|---|---|---|
| CN | 1771837 A | 5/2006 |
| JP | 45-31353 | 10/1970 |
| JP | 59-55165 | 3/1984 |
| JP | 59-187761 | 10/1984 |
| JP | 4-234959 | 8/1992 |
| JP | 8-191675 | 7/1996 |
| JP | 11-187841 | 7/1999 |
| JP | 2002-325554 | 11/2002 |
| JP | 2004-180685 | 7/2004 |
| JP | 2004-350554 | 12/2004 |
| JP | 2004-357700 | 12/2004 |
| JP | 2005-46109 | 2/2005 |
| JP | 2006-141223 | 6/2006 |
| JP | 2006-141224 | 6/2006 |
| JP | 2006-149205 | 6/2006 |
| JP | 2006-166750 | 6/2006 |
| JP | 2007-289083 | 11/2007 |
| JP | 2007-325513 | 12/2007 |
| JP | 2009-11209 | 1/2009 |
| JP | 2009-27974 | 2/2009 |
| JP | 2009-44984 | 3/2009 |
| WO | WO 2006/114918 A1 | 11/2006 |
| WO | WO 2008/120726 A1 | 10/2008 |

OTHER PUBLICATIONS

Combined Chinese Office Action and Search Report issued Oct. 10, 2012, in Patent Application No. 201080029907.0 (with English-language translation).
International Preliminary Report on Patentability and Written Opinion of the International Searching Authority issued Feb. 7, 2012, in Patent Application No. PCT/JP2010/062280, filed Jul. 14, 2010.
International Search Report issued Oct. 19, 2010, in PCT/JP2010/062280.
Masahiro Tamura, et al., "An Enhancing Effect on the Saltiness of Sodium Chloride of Added Amino Acids and Their Esters", Agric. Biol. Chem., vol. 53, No. 6, 1989, pp. 1625-1633.
Daisuke Segawa, et al., "Preparation of Low Sodium Chloride Containing Soy Sauce Using Amino Acid Based Saltiness Enhancers", Biosci. Biotech. Biochem., vol. 59, No. 1, 1995, pp. 35-39.
Norio Ishibashi, et al., "Taste of Proline-containing Peptides", Agric. Biol. Chem., vol. 52, No. 1, 1988, pp. 95-98.
Junji Mukai, et al., "Inhibitory Effect of Aroma on the Bitterness of Branched-Chain Amino Acid Solutions", Chem. Pharm. Bull., vol. 55, No. 11, Nov. 2007, pp. 1581-1584.
Tatsurokuro Tochikura, Shoyu no Kagaku to Gijutsu, Brewing Society of Japan, Mar. 31, 1994, p. 437.
Combined Office Action and Search Report issued Apr. 7, 2013, in Chinese Patent Application No. 201080029907.0 (with partial English-language translation).
Ya-dong Huang, et al., "Research on the application EPT in sauce disinfection", China Condiment, No. 1, Jan. 2008, pp. 29-32 (with partial English translation).
Office Action issued Sep. 10, 2013 in Chinese Application No. 201080029907.0 (With Partial English Translation).

*Primary Examiner* — Jyoti Chawla
(74) *Attorney, Agent, or Firm* — Oblon, McClelland, Maier & Neustadt, L.L.P.

(57) ABSTRACT

The present invention provides the packed soy sauce-containing liquid seasoning, containing the following (A), (B), (C), and (D):

| (A) sodium | 2.7 to 5.1% by mass |
|---|---|
| (B) potassium | 0.8 to 4% by mass |
| (C) proline | 0.28 to 1% by mass |
| (D) isoleucine | 0.2 to 1% by mass. |

18 Claims, No Drawings

PACKED SOY SAUCE-CONTAINING LIQUID SEASONING

FIELD OF THE INVENTION

The present invention relates to a packed soy sauce-containing liquid seasoning.

BACKGROUND OF THE INVENTION

Since excess intake of table salt (sodium chloride) tends to cause hypertension and heart disease, or can be a factor leading to metabolic syndrome, there are increasing people worrying about intake of high-salt food materials, in particular soy sauce-containing liquid seasonings such as soy sauce and processed soy sauce. Although reduced-salt soy sauce and low-salt soy sauce have low salt content, these give an insufficient salty taste and may be added again in an additional amount, resulting in a problem of not reducing intake of table salt.

Under such circumstance, there have been proposed techniques, including that of enhancing a salty taste by replacing a part of table salt in seasoning components with potassium chloride and that of further masking an unpleasant taste of potassium to give an appropriate salty taste even low content of table salt (Patent References 1 to 9). There are also known techniques, including addition of salty taste-enhancing substances such as ornithine and glycine ethyl ester (Non-Patent References 1 and 2).

Among liquid seasonings, soy sauce (shoyu) has a wide variety of applications. It is used as is by being poured on or as a dipping sauce for sashimi (sliced raw fish), hiyayakko (cold tofu), and ohitashi (dipped cold vegetable), as well as diluted with soup stock or the like for preparing men-tsuyu (noodle soup), nabe-tsuyu (hot pot soup), and nimono (stewed food) and used for finishing sauté. The techniques using potassium chloride have problems of an insufficient salty taste and disruption of a balance in taste with increased unpleasant taste of potassium when diluted with soup stock or the like particularly for preparing nimono, and now advance not so much as to develop a practical application.

Proline is known to have effects of imparting honey-like taste to improve a taste of foods and drinks, improving a color and a fishy smell of fish sauces, and imparting a sour taste accompanied with a rich taste (Patent References 10 to 12). Proline is known to have by itself delicate sweet and bitter tastes (Non-Patent Reference 3). Isoleucine is known to have by itself an unpleasant taste and have effects of enhancing a salty taste (Non-Patent Reference 4, Patent Reference 13). Methionine is known to have effects of enhancing a rich taste, enhancing a smoky flavor, and stabilizing a flavor (Patent References 14 to 18).

There is a known liquid seasoning having an increased concentration of an amino acid produced by preparing a mixture of water and a soy sauce malt from soy beans and wheat as main ingredients, by holding it under conditions of a temperature of 40 to 60° C. and a pressure of 80 to 100 MPa without adding table salt (Patent Reference 19).

REFERENCE OF PRIOR ART

Patent Reference

[Patent Reference 1] JP-A59-55165
[Patent Reference 2] JP-A59-187761
[Patent Reference 3] JP-A11-187841
[Patent Reference 4] JP-A2002-325554
[Patent Reference 5] JP-A2006-166750
[Patent Reference 6] JP-A2006-141223
[Patent Reference 7] JP-A2006-149205
[Patent Reference 8] JP-A2009-27974
[Patent Reference 9] WO 2006/114918
[Patent Reference 10] JP-A2007-289083
[Patent Reference 11] JP-A08-191675
[Patent Reference 12] JP-A2004-350554
[Patent Reference 13] JP-A04-234959
[Patent Reference 14] WO 2008/120726
[Patent Reference 15] JP-A2009-11209
[Patent Reference 16] JP-B45-31353
[Patent Reference 17] JP-A2005-46109
[Patent Reference 18] JP-A2007-325513
[Patent Reference 19] JP-A2009-044984

Non-Patent Reference

[Non-Patent Reference 1] Agric. Biol. Chem., Vol. 53, No. 6, p. 1625 (1989)
[Non-Patent Reference 2] Biosci. Biotech. Biochem., Vol. 59, No. 1, p. 35 (1995)
[Non-Patent Reference 3] Agric. Biol. Chem., Vol. 52, No. 1, p. 95 (1988)
[Non-Patent Reference 4] Chem. Pharm. Bull. Vol. 55, No. 11, p. 1581 (2007)

SUMMARY OF THE INVENTION

The present invention provides a packed soy sauce-containing liquid seasoning, containing the following (A), (B), (C), and (D):

| | |
|---|---|
| (A) sodium | 2.7 to 5.1% by mass |
| (B) potassium | 0.8 to 4% by mass |
| (C) proline | 0.28 to 1% by mass |
| (D) isoleucine | 0.2 to 1% by mass |

DETAILED DESCRIPTION OF THE INVENTION

As described above, soy sauce has a wide variety of applications. A soy sauce-containing liquid seasoning having a low salt content and containing potassium chloride particularly suffers problems of an insufficient salty taste and disruption of a balance in taste with an increased unpleasant taste of potassium when used in preparation of a sauce such as for nimono particularly by diluting with soup stock.

The present inventors have investigated problems in taste as described above, and in particular problems in taste of a soy sauce-containing liquid seasoning having a reduced content of table salt and containing potassium chloride as a substituent.

The present invention thus provides a packed soy sauce-containing liquid seasoning that has an adequate salty taste without unpleasant taste of potassium, keeps the salty taste when diluted, and is well-balanced in taste, although having a low content of table salt and containing potassium.

The present inventors have studied for a packed soy sauce-containing liquid seasoning having a good taste and being useful, and found that a packed soy sauce-containing liquid seasoning containing specific amounts of sodium, potassium, proline, and isoleucine can give an adequate salty taste without unpleasant taste of potassium, keeps the salty taste when diluted, and is well-balanced in taste, although having a low content of table salt and containing potassium. The present inventors have also found that addition of proline and isoleucine prevents reduction of a favorable brewed taste of the original soy sauce taste (soy sauce feeling), though the original soy sauce taste is lost by blending potassium.

According to the present invention, a packed soy sauce-containing liquid seasoning can be produced easily and simply, that has an adequate salty taste and a characteristic flavor of soy sauce without presenting unpleasant taste of potassium, keeps the salty taste and exhibits a soy sauce feeling when diluted, and is well-balanced in taste, although having a low content of table salt and containing potassium. The packed soy sauce-containing liquid seasoning of the present invention also enables to produce a food having a low sodium content.

The packed soy sauce-containing liquid seasoning of the present invention (hereinafter, also simply referred to as "liquid seasoning of the present invention") contains specific amounts of (A) sodium, (B) potassium, (C) proline, and (D) isoleucine.

From the points of expression of a salty taste, prevention of excess intake of sodium, balance in taste, expression of a soy sauce feeling, storage stability, and industrial productivity, the liquid seasoning of the present invention contains the sodium (A) (hereinafter, also referred to as Na) in an amount of 2.7 to 5.1% by mass (hereinafter, simply referred to as "%"), preferably 2.93 to 5.1%, more preferably 2.95 to 4.9%, more preferably 2.75 to 4%, more preferably 3 to 3.8%, more preferably 2.8 to 3.5%, more preferably 3.1 to 3.5%, more preferably 3.15 to 3.4%, even more preferably 2.85 to 3.2%, and still even more preferably 2.9 to 3.1%.

As used herein, the "sodium" refers "sodium" or "Na" as represented in Tables of Food Composition in Japan, which is contained in the liquid seasoning in the ion form (the same applies to the alkali metal or alkaline earth metal other than sodium described below). Sodium is one of the essential electrolytes for the human body, the most part of which is distributed in extracellular fluid. A concentration thereof is maintained about 135 to 145 mmol/L. It accounts for much of the cations in extracellular fluid. Excess intake of sodium thus causes fluid retention for keeping a concentration, and hence contributes heavily to hypertension.

To add sodium to the liquid seasoning of the present invention, those can be used, including inorganic sodium salts, organic acid sodium salts, amino acid sodium salts, and nucleic acid sodium salts. Specific examples of a sodium source include sodium chloride, sodium glutamate, sodium aspartate, sodium gluconate, sodium succinate, sodium inosinate, sodium guanylate, and a mixture of two or more of them. From the point of cost, table salt as sodium chloride is preferably used.

A variety of types of table salt are commercially available. From the point of taste and industrial productivity, preferred are those containing 0.01 to 2 parts by mass (hereinafter, simply referred to as "part(s)") of magnesium chloride, 0.01 to 2 parts of calcium chloride, and 0.01 to 2 parts of potassium chloride to 100 parts of sodium chloride based on dry mass.

From the points of expression of soy sauce feeling, absence of unpleasant tastes of potassium such as a bitter taste and an irritating taste, the liquid seasoning of the present invention contains the potassium (B) (hereinafter, also referred to as K) in an amount of 0.8 to 4%, preferably 0.9 to 3.50, more preferably 1 to 3.10, more preferably 1.2 to 2.8%, even more preferably 1.5 to 2.6%, and still even more preferably 1.3 to 2.6%. Potassium chloride is preferably used as a potassium source, because it has a salty taste and gives not so much unpleasant taste of potassium. When potassium chloride is used, a content thereof is 1.5 to 8%, preferably 1.7 to 6.6%, more preferably 1.9 to 5.9%, more preferably 2.2 to 5.3%, even more preferably 2.8 to 4.9%, and still even more preferably 2.5 to 4.9%.

Potassium (K) is an essential electrolyte for the human body existing in the ion form in an amount around 200 g, the most part of which is distributed in intracellular fluid. A concentration thereof in extracellular fluid is maintained very low to about 3.5 to 4.5 mmol/L. A daily requirement thereof is said to 1 to 2 g/day per capita. For preventing adult disease, the Ministry of Health, Labor and Welfare recommends intaking 3.5 g/day per capita in "reference of dietary intakes for Japanese," April, 2005.

In the present invention, contents of sodium (Na) and potassium (K) in the liquid seasoning can be measured with an atomic absorption spectrophotometer (Hitachi Polarization Zeeman Atomic Absorption Spectrophotometer model Z-6100).

From the points of balance in taste, expression of a soy sauce feeling, expression of a salty taste, and prevention of an unpleasant taste of potassium, in the liquid seasoning of the present invention, amass ratio of sodium (A)/potassium (B) (Na/K) is preferably 0.7 to 10, more preferably 0.8 to 9, more preferably 1 to 6, even more preferably 1.4 to 3, and still even more preferably 1.6 to 2.35.

From the points of prevention of an unpleasant taste of potassium, prolongation of a salty taste lasting, expression of a soy sauce feeling, addition of a rich feeling, and balance in taste, the liquid seasoning of the present invention contains the proline (C) (hereinafter, also referred to as Pro) in an amount of 0.28 to 1%, preferably 0.3 to 0.9%, more preferably 0.32 to 0.8%, more preferably 0.33 to 0.7%, even more preferably 0.36 to 0.6%, and still even more preferably 0.38 to 0.5%.

In the liquid seasoning of the present invention, a content of proline refers to a total amount of free proline derived from soy sauce and free proline derived from raw materials added other than the soy sauce, excluding those in a peptide form. Raw materials other than the soy sauce include alcoholic beverages as a raw material for a seasoning, such as Japanese sake and wine, brewed seasonings such as mirin (sweet cooking sake, e.g., hon-mirin, mirin-like seasoning, and shio-mirin) excluding soy sauce, various extracts such as vegetable, animal, and yeast extracts, protein hydrolysates, and amino acids themselves. In the present invention, a content of proline can be measured with an amino acid analyzer ("Syoyu Shikenhou (Test Methods for Soy Sauce)", Zaidan Hojin Nihon Syoyu Kenkyusyo (Japan Soy Sauce Research Foundtation) eds., published by Kabusiki Kaisya Syoukyou Tsushin-sya, 1985, hereinafter, the same applies to a measurement with the "amino acid analyzer"). Proline added as an amino acid includes L-proline, D-proline, and DL-proline. L-proline is preferred.

From the points of prevention of an unpleasant taste of potassium, prolongation of a salty taste lasting, expression of a soy sauce feeling, addition of a rich feeling, and balance in taste, in the liquid seasoning of the present invention, a mass ratio of potassium (B)/proline (C) (K/Pro) is preferably 2 to 10, more preferably 2.5 to 9, more preferably 3 to 8, more preferably 3.5 to 7, even more preferably 4 to 6.5, and still even more preferably 4.5 to 6.

From the points of prevention of an unpleasant taste of potassium, prolongation of a salty taste lasting, expression of a soy sauce feeling, addition of a rich feeling, balance in taste, and solubility, the liquid seasoning of the present invention preferably contains the isoleucine (D) (hereinafter, also referred to as Ile) in an amount of 0.2 to 1%, more preferably 0.21 to 0.8%, more preferably 0.28 to 0.7%, more preferably 0.3 to 0.6%, even more preferably 0.33 to 0.5%, and still even more preferably 0.35 to 0.45%.

In the liquid seasoning of the present invention, a content of isoleucine refers a total amount of free isoleucine derived from soy sauce and free isoleucine derived from raw materials added other than the soy sauce, excluding those in a peptide form. Raw materials other than the soy sauce include alcoholic beverages as a raw material for a seasoning such as Japanese sake and wine, brewed seasonings such as mirin (sweet cooking sake, e.g., hon-mirin, mirin-like seasoning, and shio-mirin) excluding soy sauce, various extracts such as vegetable extract, animal extract, and yeast extracts, protein hydrolysates, and amino acids themselves. In the present invention, a content of isoleucine can be measured with an amino acid analyzer. Isoleucine added as an amino acid includes L-isoleucine, D-isoleucine, and DL-isoleucine. L-isoleucine is preferred.

From the points of prevention of an unpleasant taste of potassium, prolongation of a salty taste lasting, expression of a soy sauce feeling, addition of a rich feeling, and balance in taste, in the liquid seasoning of the present invention, a mass ratio of proline (C)/isoleucine (D) (Pro/Ile) is preferably 0.9 to 3, more preferably 0.95 to 2, more preferably 0.99 to 1.6, even more preferably 1 to 1.5, and still even more preferably 1.1 to 1.4.

From the points of addition of a rich feeling, prevention of an unpleasant taste of isoleucine, prevention of an unpleasant taste of potassium, balance in taste, and reduction of a fishy smell of sashimi, in the present invention, the liquid seasoning preferably contains methionine (E) (hereinafter, also referred to as Met) in an amount of 0.07 to 0.5%, more preferably 0.08 to 0.4%, more preferably 0.09 to 0.3%, even more preferably 0.1 to 0.2%, and still even more preferably 0.12 to 0.15%.

When the liquid seasoning of the present invention contains methionine in an amount as described above, the content refers to a total amount of free methionine derived from soy sauce and free methionine derived from raw materials added other than the soy sauce, excluding those in a peptide form. Raw materials other than the soy sauce include alcoholic beverages as a raw material for a seasoning such as Japanese sake and wine, brewed seasonings such as mirin (sweet cooking sake, e.g., hon-mirin, mirin-like seasoning, and shio-mirin) excluding soy sauce, various extracts such as vegetable extract, animal extract, and yeast extract, protein hydrolysates, and amino acids themselves. In the present invention, a content of methionine can be measured with an amino acid analyzer. Methionine added as an amino acid includes L-methionine, D-methionine, and DL-methionine. L-methionine is preferred.

From the points of prevention of an unpleasant taste of potassium, prolongation of a salty taste lasting, expression of a soy sauce feeling, addition of a rich feeling, and balance in taste, in the liquid seasoning of the present invention, a mass ratio of methionine (E)/isoleucine (D) (Met/Ile) is preferably 0.1 to 0.7, more preferably 0.15 to 0.6, more preferably 0.2 to 0.5, more preferably 0.24 to 0.45, even more preferably 0.29 to 0.4, and still even more preferably 0.33 to 0.38.

The liquid seasoning of the present invention preferably has an acidic amino acid content of less than 2% or a basic amino acid content of less than 1%, and more preferably an acidic amino acid content of less than 2% and a basic amino acid content of less than 1%, from the point of balance in taste.

From the point of balance in taste, in the liquid seasoning of the present invention, a content of a free acidic amino acid is preferably less than 2%, more preferably 0.1 to 2%, more preferably 0.15 to 1.5%, even more preferably 0.2 to 1.2%, and still even more preferably 0.3 to less than 1%.

As used herein, the acidic amino acid is aspartic acid and glutamic acid. A content of aspartic acid is preferably less than 1.4%, more preferably 0.1 to 0.95%, more preferably 0.14 to 0.9%, even more preferably 0.15 to 0.7%, and still even more preferably 0.2 to 0.55%. A content of glutamic acid is preferably less than 1.9%, more preferably 0.2 to 1.7%, even more preferably 0.4 to 1.2%, and still even more preferably 0.6 to 0.9%.

From the point of balance in taste, in the liquid seasoning of the present invention, a content of a free basic amino acid is preferably less than 1%, more preferably 0.1 to 0.9%, even more preferably 0.2 to 0.8%, and still even more preferably 0.3 to 0.7%.

As used herein, the basic amino acid is histidine, lysine, and arginine. A content of histidine is preferably less than 0.5%, more preferably 0.08 to 0.4%, even more preferably 0.11 to 0.3%, and still even more preferably 0.12 to 0.18%. A content of lysine is preferably less than 0.5%, more preferably 0.1 to 0.45%, even more preferably 0.2 to 0.42%, and still even more preferably 0.3 to 0.4%. A content of arginine is preferably less than 0.5%, more preferably 0.1 to 0.49%, even more preferably 0.2 to 0.45%, and still even more preferably 0.3 to 0.41%.

From the points of prevention of an unpleasant taste of potassium, addition of a rich feeling, and balance in taste, the liquid seasoning of the present invention preferably contains one or two or more umami seasoning agents (F) selected from succinic acid, inosinic acid and guanylic acids in an amount of 0.01 to 20.

When the liquid seasoning of the present invention contains succinic acid as the component (F), succinic acid is preferably in a salt form. For example, disodium succinate is used, sodium part thereof serving as component (A) of the invention, succinate part serving as component (F).

When the liquid seasoning of the present invention contains a nucleic acid seasoning agent as the component (F), such as inosinic acid and guanylic acid, a salt of the nucleic acid seasoning agent is preferable, such as sodium inosinate and sodium guanylate. For example, disodium inosinate (inosine-5'-monophosphate disodium salt) is used, sodium part thereof serving as component (A), inosinate part serving as component (F).

From the points of prevention of an unpleasant taste of potassium, addition of a rich feeling, and balance in taste, the liquid seasoning of the present invention preferably contains the umami seasoning agent (F) in an amount of 20 to 250 parts, more preferably 25 to 150 parts, more preferably 30 to 100 parts, even more preferably 35 to 70 parts, and still even more preferably 40 to 50 parts to 100 parts of the sodium (A).

From the points of prevention of an unpleasant taste of potassium, prolongation of a salty taste lasting, expression of a soy sauce feeling, addition of a rich feeling, balance in taste, and solubility, the liquid seasoning of the present invention preferably contains leucine (hereinafter, also referred to as Leu) in an amount of 0.1 to 1%, more preferably 0.15 to 0.9% more preferably 0.2 to 0.8%, more preferably 0.3 to 0.7%, even more preferably 0.4 to 0.6%, and still even more preferably 0.48 to 0.55%.

In the liquid seasoning of the present invention, a content of leucine refers to a total amount of free leucine derived from soy sauce and free leucine derived from raw materials added other than the soy sauce, excluding those in a peptide form. Raw materials other than the soy sauce include alcoholic beverages as a raw material for a seasoning, such as Japanese sake and wine, brewed seasonings such as mirin (sweet cooking sake, e.g., hon-mirin, mirin-like seasoning, and shio-mirin) excluding soy sauce, various extracts such as vegetable extract, animal extract, and yeast extract, protein hydrolysates, and amino acids themselves. In the present invention, a content of leucine can be measured with an amino acid analyzer. Leucine added as an amino acid includes L-leucine, D-leucine, and DL-leucine. L-leucine is preferred.

From the points of prevention of an unpleasant taste of potassium, prolongation of a salty taste lasting, expression of a soy sauce feeling, addition of a rich feeling, balance in taste, and solubility, the liquid seasoning of the present invention preferably contains phenylalanine (hereinafter, also referred to as Phe) in an amount of 0.15 to 0.5%, more preferably 0.25 to 0.49%, more preferably 0.3 to 0.48%, more preferably 0.35 to 0.47%, even more preferably 0.37 to 0.46%, and still even more preferably 0.38 to 0.45%.

In the liquid seasoning of the present invention, a content of phenylalanine refers to a total amount of free phenylalanine derived from soy sauce and free phenylalanine derived from raw materials added other than the soy sauce, excluding those in a peptide form. Raw materials other than the soy sauce include alcoholic beverages as a raw material for a seasoning such as Japanese sake and wine, brewed seasonings such as mirin (sweet cooking sake, e.g., hon-mirin, mirin-like seasoning, and shio-mirin) excluding soy sauce, various extracts such as vegetable extract, animal extract, and yeast extract, protein hydrolysates, and amino acids themselves. In the present invention, a content of phenylalanine can be measured with an amino acid analyzer. Phenylalanine added as an amino acid includes L-phenylalanine, D-phenylalanine, and DL-phenylalanine. L-phenylalanine is preferred because D-form of phenylalanine has a sweet taste.

From the points of prevention of an unpleasant taste of potassium, prolongation of a salty taste lasting, expression of a soy sauce feeling, addition of a rich feeling, and balance in taste, in the liquid seasoning of the present invention, a mass ratio of potassium/phenylalanine (K/Phe) is preferably 3 to 7, more preferably 3.5 to 6, even more preferably 4 to 5.5, and still even more preferably 4.5 to 5.

From the points of expression of effects of proline, prevention of an unpleasant taste of potassium, a salty taste, a sweet taste, balance in taste, and expression of a soy sauce feeling, the liquid seasoning of the present invention preferably contains a sugar alcohol in an amount of 0.1 to 5%, more preferably 0.3 to less than 3%, more preferably 0.5 to 2.7%, even more preferably 0.7 to 2.5%, and still even more preferably 1 to 2%. Examples of the sugar alcohol include erythritol, glycerol, sorbitol, trehalose, and reduced starch syrup. Preferably used are glycerol, erythritol, and a mixture thereof, and particularly preferred is glycerol.

When the liquid seasoning of the present invention contains trehalose, from the point of expression of effects of proline, sweet taste, and balance in taste, a content thereof is preferably less than 3%, more preferably 0 to 2%, and even more preferably 0.01 to 1%.

A content of a sugar alcohol refers to a total amount of a sugar alcohol derived from raw materials and a sugar alcohol further added. Raw materials including alcoholic beverages such as Japanese sake and wine, brewed seasonings such as mirin (sweet cooking sake, e.g., hon-mirin, mirin-like seasoning, and shio-mirin), and fermentation products may provide a sugar alcohol derived from the raw material. In this case, a total amount of a sugar alcohol derived from raw materials and a sugar alcohol further added should be within the range described above. A content of a sugar alcohol can be measured by liquid chromatography (HPLC).

From the points of expression of a soy sauce feeling, prevention of an unpleasant taste of potassium, storage stability, and balance in taste, the liquid seasoning of the present invention preferably has acidic pH ranging from not less than 2 and less than 7, more preferably 2.5 to 6.5, more preferably 3 to 6, even more preferably 3.5 to 5.5, and even more preferably 4 to 5. The pH can be adjusted within the desired range by addition of an acidulant or the like.

Examples of the acidulant that can be added to the liquid seasoning of the present invention include lactic acid, acetic acid, succinic acid, malic acid, citric acid, tartaric acid, phosphoric acid, and phytic acid. Among these acids, preferred are lactic acid, malic acid, citric acid, phosphoric acid, and phytic acid, and particularly preferred is lactic acid. A content of lactic acid is preferably 0 to 2%, more preferably 0.01 to 1%, even more preferably 0.02 to 0.5%, and still even more preferably 0.04 to 0.1%. A content of malic acid, citric acid, phosphoric acid, and phytic acid is preferably 0 to 0.2%, and more preferably 0.02 to 0.1%. From the points of taste, production efficiency, and cost, the pH is preferably adjusted within the predetermined range with a vinegar and citrus juice in industry. Examples of the vinegar include grain vinegars such as rice vinegar, fruit vinegars such as apple vinegar and wine vinegar, brewed vinegars, and synthetic vinegars.

The liquid seasoning of the present invention can be produced by blending, stirring, mixing, and dissolving the sodium (A), the potassium (B), the proline (C) and the isoleucine (D) in soy sauce in predetermined contents to obtain a seasoning liquid, and filling the liquid in a pack. The liquid seasoning of the present invention may also contains other components including the component (E) or (F), materials that can be used in foods, for example, an acidulant, an inorganic salt, an acid, an excipient, a spice, a seasoning agent other than umami, an antioxidant, a colorant, a preservative, a reinforcing agent, an emulsifier, a herb, vegetables and the like, and water, according to need.

When reduced-salt soy sauce and low-salt soy sauce having a reduced salt content (sodium content) are used to produce the liquid seasoning of the present invention, production of the liquid seasoning can be performed by subjecting raw soy sauce to electrophoresis or salting-out/dilution to provide unheated soy sauce (unheated reduced-salt soy sauce, unheated low-salt soy sauce) having a reduced content of table salt, firing the unheated soy sauce, and mixing with components (A), (B), (C), and (D) and the like, or by firing raw soy sauce, subjecting the heated soy sauce to electrophoresis or salting-out/dilution to provide soy sauce (reduced-salt soy sauce, low-salt soy sauce) having a reduced content of table salt, and mixing with components (A), (B), (C), and (D) and the like. When the produced liquid seasoning is then filled in a pack, it is preferably subjected to a heat treatment. In this case, from the points of taste, stability, and color, the liquid seasoning is preferably (1) subjected to a heat treatment and filled in a container before the liquid seasoning is cooled, (2) filled in a container with a heat treatment, or (3) filled in a container and subjected to a heat treatment.

Production of the liquid seasoning of the present invention preferably contains a heat treatment. The liquid seasoning can be produced by filling a seasoning liquid in a container and subsequently heating the pack, or by heating a seasoning liquid with a heat exchanging plate or the like and subsequently filling in a pack. From the points of taste, stability, and color, a heating temperature is preferably not less than 60° C., more preferably 70 to 130° C., more preferably 75 to 120° C., even more preferably 80 to 100° C., and still even more preferably 85 to 95° C. From the points of taste, stability, and color, a heating time, depending on a heating temperature, is preferably 10 seconds to 120 minutes, more preferably 30 seconds to 60 minutes, even more preferably 1 minute to 10 minutes, and still even more preferably 2 minutes to 5 minutes at 60° C. At 80° C., from the points of taste, stability, color and the like, a heating time is preferably 2 seconds to 60 minutes, more preferably 5 seconds to 30 minutes, even more preferably 10 seconds to 10 minutes, and still even more preferably 30 seconds to 5 minutes. At 90° C., from the points of taste, stability, color and the like, a heating time is 1 second to 30 minutes, more preferably 2 seconds to 10 minutes, even more preferably 5 seconds to 5 minutes, and still even more preferably 10 seconds to 2 minutes. Heating may be performed under combined conditions of heating temperature and heating time such as for 10 minutes or more at 60 to 70° C. and then for one or more minutes at 80° C.

The liquid seasoning of the present invention is produced by filling the soy sauce-containing liquid seasoning in a container. From the points of stability and usability, a volume of the container used in the present invention is preferably 5 mL to 20 L, more preferably 10 mL to 5 L, more preferably 50 mL to 2 L, more preferably 100 mL to 1 L, even more preferably 200 mL to 800 mL, and still even more preferably 300 to 600 mL. The container used in the present invention may be of a common type used for general liquid seasonings, including molded container mainly composed of poly (ethylene terephthalate) (or PET bottle), metal can, paper pack, synthetic resin pouch, and glass bottle, and the like. Examples of the paper pack include that prepared by forming a laminate having a paper base, a barrier layer (e.g., metal foil such as aluminum foil, ethylene-vinyl alcohol copolymer, and vinylidene chloride copolymer), and a heat-sealing resin layer.

The container used in the present invention further preferably has an oxygen transmission index of not less than 0.8 ($cm^3/day·m^2$). As used herein, the "oxygen transmission index" refers a value of oxygen transmission per square meter of a material of the container calculated by dividing an "oxygen transmission rate" (in $cm^3/day·bottle$) determined according to JIS K 7126 B by a surface area of the container. The oxygen transmission rate is more specifically a value determined by supplying oxygen on one side of a test piece (container), flowing a nitrogen carrier gas at the same pressure on the other side, and measuring transmitted oxygen with an oxygen detector (20° C., relative humidity 600) using a MOCON apparatus. From the points of storage stability and taste preservation, the container used in the present invention preferably has an oxygen transmission index of 0 to 0.6, more preferably 0 to 0.4, more preferably 0.01 to 0.2, even more preferably 0.02 to 0.15, and still even more preferably 0.05 to 0.12.

The container used in the present invention can be prepared by choosing materials for an inner layer/a middle layer/an outer layer to have the barrier properties as describe above, and adhering them with an adhesive according to need. From the points of barrier properties, appearance, workability, storage stability, feeling in use, and strength, as materials for the inner and the outer layers, preferably used are polypropylene (PP), polyethylene (PE), poly(ethylene terephthalate) (PET), oriented products therefrom, density-modified products therefrom, and composites thereof with other materials. Among these materials, more preferably used are polypropylene, oriented polypropylene, polyethylene, oriented polyethylene, high density polyethylene, middle density polyethylene, low density polyethylene, a straight-chain low density polyethylene, and oriented poly(ethylene terephthalate), and even more preferably polypropylene, oriented polypropylene, and high density polyethylene. Particularly preferably used is high-density polyethylene.

The single-layer resin container and the multi-layer resin container as described above may be coated with a carbon film or a silicon film on the outer and/or inner side so as to have the barrier properties as described above. For example, the container may be made of poly(ethylene terephthalate) coated with carbon film or silicon film. Examples of the container further include a single-layer preform produced by dry-mixing a PET resin with various nylon resins such as a metaxylene group-containing polyamide resin (e.g., MXD-6 nylon resin (MxD-6Ny) so as to have desired barrier properties as described above and molding.

For the middle layer of the container used in the present invention, from the point of barrier properties, storage stability, and feeling in use, preferably used are ethylene-vinyl alcohol copolymers (EVOH) having high barrier properties against oxygen transmission. For example, ethylene-vinyl acetate copolymers having an ethylene content of 20 to 60% by mole, and particularly 25 to 50% by mole are saponified to a degree of not less than 96% by mole, and particularly not less than 99% by mole to be used. The ethylene-vinyl alcohol copolymer used preferably has a molecular weight sufficiently large for forming a film.

Examples of other polymer than the ethylene-vinyl alcohol copolymer include polyamides such as nylon 6, nylon 6,6, nylon 6/6,6 copolymer, metaxylylene adipamide, nylon 6,10, nylon 11, nylon 12, and nylon 13.

When adhesion to other layers is insufficient as in the case of using the ethylene-vinyl alcohol copolymer, an adhesive is preferably used. Examples of the adhesive include thermoplastic resins having a carbonyl group derived from carboxylic acid, carboxylic acid amide, carboxylic acid ester, or the like in their main or side chains. Specific examples thereof include ethylene-acrylic acid copolymers, ionically crosslinked olefin copolymers, maleic anhydride grafted polyethylenes, maleic anhydride grafted polypropylenes, acrylic acid grafted polyolefins, ethylene-vinyl acetate copolymers, polyester copolymers, and polyamide copolymers. These may be used alone or in combination of two or more. These adhesive resins are useful for lamination by co-extruding or sandwich lamination. For adhesion lamination of pre-formed oxygen permeation barrier film and moisture permeation barrier films, thermosetting adhesive resins including isocyanate resins and epoxy resins may also be used.

Among them, particularly preferably used are Admer manufactured by Mitsui Chemicals, Inc. and Modic manufactured by Mitsubishi Chemical Corporation that adhere ethylene-vinyl alcohol copolymers.

To impart transparency as well as the barrier properties to the container used in the present invention, the container, for example, preferably has a four-layer construction including an inner and outer layers made of polypropylene (PP) that is highly transparent orientated thermoplastic resin, an intermediate layer made of cyclic olefin polymer, and another intermediate layer made of ethylene-vinyl alcohol copolymer (EVOH). There are adhesive layers in each interspace among PP layers constructing the inner and the outer layers and COP and EVOH layers constructing intermediate layers.

The cyclic olefin polymer (COP) as used herein is a resin having good transparency and moisture barrier properties. Examples of the COP used include Zeonor (cycloolefin polymer) manufactured by Zeon Corporation, APEL (cycloolefin copolymer) manufactured by Mitsui Chemicals, Inc.

The container used in the present invention can be prepared by any known method per se as long as it has the barrier properties described above and transparency. For example, an extrusion-molded multilayer container can be prepared by melting and kneading resins with extruders for the respective resin layers and extrusion-molding with a multilayer-multipiling molding die. An injection-molded multilayer container can be prepared by injection-molding, such as co-injection or successive injections, with the number of injection-molding machines according to the number of resins.

As used herein, the soy sauce-containing liquid seasoning refers a seasoning in the liquid form that generally contains soy sauce such as normal soy sauce and dashi (Japanese broth)-added soy sauce in an amount of not less than 1%, preferably 5 to 99%, more preferably 10 to 97%, more preferably 30 to 95%, even more preferably 50 to 93%, and still even more preferably 70 to 90%. The soy sauce-containing liquid seasoning also include a liquid seasoning for similar applications as of the "soy sauce," which is prepared by blending soy sauce with additives such as a seasoning agent, an acidulant, a flavorant, a dashi stock, and an extract. In other words, the soy sauce-containing liquid seasoning means soy sauce, processed soy sauce, soup stock, or dipping sauce. In the present invention, the soy sauce-containing liquid seasoning is preferably soy sauce or processed soy sauce, and more preferably processed soy sauce.

In the present invention, the "soy sauce" is a liquid seasoning as defined in Quality Labeling Standard for Soy Sauce (Ministry of Agriculture, Forestry and fisheries, announcement No. 1704, Sep. 13, 2004).

In the present invention, the "processed soy sauce" refers those having a product name containing soy sauce such as "XXX soy sauce" among liquid seasonings mainly composed of soy sauce. The processed soy sauce is produced by blending soy sauce as a main material with sub ingredients such as a seasoning agent, an acidulant, a flavorant, fruit juice, raw materials for flavoring, and a dashi stock. Examples of the processed soy sauce include dashi-added soy sauce, kelp broth-added soy sauce, Tosa shoyu (soy sauce seasoned with bonito and mirin), bonito broth-added soy sauce, ponzu sauce with soy sauce, soy sauce for steak, oyster-flavored soy sauce, shiso-flavored soy sauce, garlic-flavored soy sauce, and wasabi-flavored soy sauce.

In the present invention, the "tsuyu" refers a liquid that is prepared by blending soy sauce with sugars and "dashi stock" extracted from raw materials for seasoning (e.g., dried bonito, kelp, and dried shiitake mushroom) or by further adding other ingredients such as mirin, table salt, and other seasoning additive and that can be used as is or in a diluted state for dressing on or serving as a dipping sauce of noodles and house-hold dishes. Examples of the tsuyu include men-tsuyu (tsuyu for noodle), nimono-tsuyu (tsuyu for stewing), nabemono-tsuyu (tsuyu for hot pot), ten-tsuyu (tsuyu for tempura), and hanyou-tsuyu (tsuyu for all-purpose). Examples of the men-tsuyu include tsuyu for soba (buckwheat noodle), udon (Japanese wheat noodle), soumen (Japanese wheat thin noodle), hiyamugi (Japanese wheat middle width noodle), tyukamen (ramen noodle), and hiyashi tyuka (chilled ramen noodle).

In the present invention, the "tare" refers a sauce based on "soy sauce" other than the "processed soy sauce" and the "tsuyu". Examples of the "tare" include kabayaki-no-tare (sauce for grilled eel), yakitori-no-tare (sauce for grilled chicken), yakiniku-no-tare (barbecue sauce), shabushabu-no-tare (dipping sauce for shabushabu), sukiyaki-no-tare (sauce for sukiyaki), teriyaki-no-tare (sauce for boiling and grilling), karaage-no-tare (sauce for deep fried chicken), and mitarashi-dango-no-tare (sauce for rice dough dumpling), and also oil-free dressing.

In the liquid seasoning of the present invention, examples of the soy sauce used as a raw material include koikuti shoyu (regular soy sauce), usukuti shoyu (light soy sauce), tamari shoyu (heavy soy sauce), low-salt soy sauce, and reduced-salt soy sauce. From the points of intake of table salt and balance in taste, preferably used are low-salt soy sauce and reduced-salt soy sauce, these having a sodium content of more than 3.55 g to not more than 5.5 g and not more than 3.55 g, respectively, in 100 g of a product.

The liquid seasoning of the present invention can be used directly from the container for preparing/processing/cooking foods to achieve effects of preventing an unpleasant taste of potassium, providing a soy sauce feeling, and improving a balance in taste. Therefore, the present invention is also useful as a method for improving a taste, a method for processing/cooking a food, and/or a method for preparing a food.

The liquid seasoning of the present invention can be used in a variety of foods. A food produced with the liquid seasoning of the present invention can exhibit a strong salty taste though having a low content of table salt. The present invention thus enables to design a food having a low salt content.

Examples of the food produced with the liquid seasoning of the present invention, which may be of any type as long as it contains a table salt on eating, include cooked dishes such as salad, sashimi, ohitashi, hiyayakko, yudofu (boiled tofu), nabemono (hot pot), nimono, agemono (fried food), yakimono (grilled food), mushimono (steamed food), and sunomono (vinegared food). In other words, examples of the application (way to use) of the liquid seasoning of the present invention for food include dressing the liquid seasoning directly on these dishes, serving the liquid seasoning as a dipping sauce for these dishes, cooking a food material with the liquid seasoning, and producing a processed food with the liquid seasoning.

From the points of balance in taste and intake of sodium or table salt, a content of the liquid seasoning of the present invention in a food is preferably 0.01 to 50%, more preferably 0.05 to 20%, even more preferably 0.1 to 10%, and still even more preferably 0.5 to 50.

EXAMPLES

The following Examples demonstrate the present invention. Examples are intended to illustrate the present invention and not to limit the present invention.

(1) Test Samples 1 to 14

Each of packed soy sauce-containing liquid seasonings ("processed soy sauces", Test Samples 1 to 14) was prepared by placing soy sauce (koikutishoyu, Kikkoman Corporation), sodium chloride (Wako Pure Chemical Industries, Ltd.), potassium chloride (Wako Pure Chemical Industries, Ltd.), L-proline (Wako Pure Chemical Industries, Ltd.), L-isoleucine (Wako Pure Chemical Industries, Ltd.), DL-methionine (Wako Pure Chemical Industries, Ltd.), sodium L-aspartate (Wako Pure Chemical Industries, Ltd.), sodium L-glutamate (Wako Pure Chemical Industries, Ltd.), L-histidine hydrochloride (Wako Pure Chemical Industries, Ltd.), and water in amounts shown in Table 1 in a glass sample bottle (100 mL), capping the bottle. It was heated for 10 minutes at 90° C. in a hot bath to dissolve the ingredients.

Packed soy sauce-containing liquid seasonings were subjected to component analysis according to the method described above. Results are shown in Table 1. In Table 1, Na refers to sodium, K refers to potassium, Pro refers to proline, Ile refers to isoleucine, Met refers to methionine, Asp refers to aspartic acid, Glu refers to glutamic acid, Arg refers to arginine, Lys refers to lysine, His refers to histidine, and Ala refers to alanine (the same applies to the following tables).

To evaluate a taste, packed soy sauce-containing liquid seasonings were also subjected to a sensory evaluation with the rating scales below. Results are shown in Table 1. For a salty taste, Test Sample 1 was rated as rank d. For an unpleasant taste of potassium, Test Sample 1 was rated as rank a, and Test Sample 2 as rank d. For a feeling of soy sauce, Test Sample 1 was rated as rank c. Based on these ratings, other Test Samples were evaluated relatively.

<salty taste>
  a: very strong
  b: strong
  c: slightly strong
  d: weak
  e: very weak <unpleasant taste of potassium>
  a: absolutely not perceived
  b: slightly perceived, but not bothered
  c: moderately perceived, but not unpalatable
  d: perceived and unpalatable
  e: strongly perceived and very unpalatable <soy sauce feeling>
  a: very strong
  b: strong
  c: slightly strong
  d: weak
  e: very weak

TABLE 1

| | | Test sample 1 | Test sample 2 | Test sample 3 | Test sample 4 | Test sample 5 | Test sample 6 | Test sample 7 |
|---|---|---|---|---|---|---|---|---|
| Component (% by mass) | Soy sauce | 50 | 50 | 50 | 50 | 50 | 50 | 50 |
| | Sodium chloride | 1.5 | 1.5 | 1.5 | 1.5 | 1.5 | 1.5 | 1.5 |
| | Potassium chloride | 0 | 4 | 0 | 0 | 0 | 4 | 4 |
| | L-proline | 0 | 0 | 0.15 | 0 | 0 | 0 | 0 |
| | L-isoleucine | 0 | 0 | 0 | 0.05 | 0 | 0 | 0.05 |
| | DL-methionine | 0 | 0 | 0 | 0 | 0.03 | 0 | 0 |
| | Sodium L-aspartate | 0 | 0 | 0 | 0 | 0 | 1.2 | 0 |
| | Sodium L-glutamate | 0 | 0 | 0 | 0 | 0 | 0.8 | 0 |
| | L-hystidine | 0 | 0 | 0 | 0 | 0 | 0 | 0 |
| | Water | 48.5 | 44.5 | 48.35 | 48.45 | 48.47 | 42.5 | 44.45 |
| | Total | 100 | 100 | 100 | 100 | 100 | 100 | 100 |
| Content (% by mass) | Na | 3.279 | 3.279 | 3.279 | 3.279 | 3.279 | 3.553 | 3.279 |
| | K | 0.210 | 2.306 | 0.210 | 0.210 | 0.210 | 2.306 | 2.306 |
| | Pro | 0.137 | 0.137 | 0.287 | 0.137 | 0.137 | 0.137 | 0.137 |
| | Ile | 0.166 | 0.166 | 0.166 | 0.216 | 0.166 | 0.166 | 0.216 |
| | Met | 0.049 | 0.049 | 0.049 | 0.049 | 0.079 | 0.079 | 0.049 |
| | Asp | 0.070 | 0.070 | 0.070 | 0.070 | 0.070 | 1.091 | 0.070 |
| | Glu | 0.369 | 0.369 | 0.369 | 0.369 | 0.369 | 1.064 | 1.064 |
| | Arg | 0.201 | 0.201 | 0.201 | 0.201 | 0.201 | 0.201 | 0.201 |
| | Lys | 0.162 | 0.162 | 0.162 | 0.162 | 0.162 | 0.162 | 0.162 |
| | His | 0.057 | 0.057 | 0.057 | 0.057 | 0.057 | 0.057 | 0.057 |
| | Ala | 0.292 | 0.292 | 0.292 | 0.292 | 0.292 | 0.292 | 0.292 |
| | K/Pro ratio | 1.533 | 16.832 | 0.732 | 1.533 | 1.533 | 16.832 | 16.832 |
| | Na/K ratio | 15.614 | 1.422 | 15.614 | 15.614 | 15.614 | 1.541 | 1.422 |
| | Pro/Ile ratio | 0.825 | 0.825 | 1.729 | 0.634 | 0.825 | 0.825 | 0.634 |
| | Met/Ile ratio | 0.295 | 0.295 | 0.295 | 0.227 | 0.476 | 0.476 | 0.227 |
| Taste evaluation | Salty taste | d | c | d | c-d | c-d | a-b | b |
| | Unpleasant taste of potassium | a | d | a | a | a | a-b | c-d |
| | Soy sauce feeling | c | d | b-c | b-c | c | c | b-c |
| | Comments | A salty taste was rated as d. This sample had a bland, flat and light general taste. An unpleasant taste of K was not perceived and rated as a. A soy sauce feeling was rated as c. | An unpleasant taste of K was perceived and rated as d. A salty taste was increased but a soy sauce feeling was decreased than that of Test sample 1. | A first taste was milder than that of Test sample 1, while a salty taste was lasting. This sample had an after taste with sweetness. | A salty taste was sharper than that of Test sample 1, but was poor rather than rich. An unpleasant taste of Ile was perceived. | This sample was imparted with a rich feeling and had a rich after taste. A salty taste looked like lasting longer than Test sample 1. | A salty taste was stronger than that of Test sample 1. An unpleasant taste of K was not perceived. Test sample 6 had an umami taste but not a strong soy sauce feeling. | This sample had a sharper first taste than Test sample 2 and was salty taste. Unpleasant taste of K and Ile were lasting. A soy sauce feeling was increased. |

| | | Test sample 8 | Test sample 9 | Test sample 10 | Test sample 11 | Test sample 12 | Test sample 13 | Test sample 14 |
|---|---|---|---|---|---|---|---|---|
| Component (% by mass) | Soy sauce | 50 | 50 | 50 | 50 | 50 | 50 | 50 |
| | Sodium chloride | 1.5 | 1.5 | 1.5 | 1.5 | 1.5 | 1.5 | 1.5 |
| | Potassium chloride | 4 | 4 | 4 | 4 | 4 | 4 | 4 |
| | L-proline | 0 | 0.05 | 0.15 | 0.15 | 0.2 | 0.23 | 0.28 |
| | L-isoleucine | 0 | 0 | 0 | 0.05 | 0.05 | 0.1 | 0.14 |
| | DL-methionine | 0.03 | 0 | 0 | 0 | 0.03 | 0.04 | 0.06 |
| | Sodium L-aspartate | 0 | 0 | 0 | 0 | 0 | 0 | 0 |
| | Sodium L-glutamate | 0 | 0 | 0 | 0 | 0 | 0 | 0 |
| | L-hystidine | 0 | 0 | 0 | 0 | 0 | 0 | 0.1 |

TABLE 1-continued

|  |  |  |  |  |  |  |  |  |
|---|---|---|---|---|---|---|---|---|
|  | Water | 44.47 | 44.45 | 44.35 | 44.3 | 44.22 | 44.13 | 43.92 |
|  | Total | 100 | 100 | 100 | 100 | 100 | 100 | 100 |
| Content (% by mass) | Na | 3.279 | 3.279 | 3.279 | 3.279 | 3.279 | 3.279 | 3.279 |
|  | K | 2.306 | 2.306 | 2.306 | 2.306 | 2.306 | 2.306 | 2.306 |
|  | Pro | 0.137 | 0.187 | 0.287 | 0.287 | 0.337 | 0.367 | 0.417 |
|  | Ile | 0.166 | 0.166 | 0.166 | 0.216 | 0.216 | 0.266 | 0.306 |
|  | Met | 0.079 | 0.049 | 0.049 | 0.049 | 0.079 | 0.099 | 0.109 |
|  | Asp | 0.070 | 0.070 | 0.070 | 0.070 | 0.070 | 0.070 | 0.070 |
|  | Glu | 1.064 | 1.064 | 1.064 | 1.064 | 1.064 | 1.064 | 1.064 |
|  | Arg | 0.201 | 0.201 | 0.201 | 0.201 | 0.201 | 0.201 | 0.201 |
|  | Lys | 0.162 | 0.162 | 0.162 | 0.162 | 0.162 | 0.162 | 0.162 |
|  | His | 0.057 | 0.057 | 0.057 | 0.057 | 0.057 | 0.057 | 0.157 |
|  | Ala | 0.292 | 0.292 | 0.292 | 0.292 | 0.292 | 0.292 | 0.292 |
|  | K/Pro ratio | 16.832 | 12.332 | 8.035 | 8.035 | 6.843 | 6.283 | 5.530 |
|  | Na/K ratio | 1.422 | 1.422 | 1.422 | 1.422 | 1.422 | 1.422 | 1.422 |
|  | Pro/Ile ratio | 0.825 | 1.127 | 1.729 | 1.329 | 1.560 | 1.380 | 1.363 |
|  | Met/Ile ratio | 0.476 | 0.295 | 0.295 | 0.227 | 0.366 | 0.372 | 0.356 |
| Taste evaluation | Salty taste | b-c | b-c | b-c | b | b | a-b | a |
|  | Unpleasant taste of potassium | c | c-d | b-c | b-c | b | a-b | a |
|  | Soy sauce feeling | c-d | c-d | c | b | b | a-b | a |
|  | Comments | An unpleasant taste of K was moderately decreased than that of Test sample 2. This sample had a rich after taste. Tastes were harmonized. | A salty taste was lasting moderately longer than that of Test sample 2. A first taste was moderately mild. An unpleasant taste of K was moderately decreased. | A salty taste was lasting longer than that of Test sample 2. A first taste was moderately mild. An unpleasant taste of K was moderately perceived but decreasced. A soy sauce feeling was moderately increased. | A salty taste was sharper than that of Test sample 2, and lasting longer than that of Test sample 2. An unpleasant taste of K was decreased. A soy sauce feeling was increased. | A salty taste was sharper than that of Test sample 2, and lasting longer than that of Test sample 2. An unpleasant taste of K was decreased. A soy sauce feeling was increased. An unpleasant taste of Ile was decreased. | A salty taste was largely increased than that of Test sample 2. This sample had a rich feeling in an after taste and rich taste overall. An unpleasant taste of K was little or not perceived. A soy sauce feeling was increased. An unpleasant taste of Ile was largely decreased. | A salty taste was very largely increased than that of Test sample 2. Test sample 14 has a rich feeling in after taste and a very rich taste overall. An unpleasant taste of K was not perceived. A soy sauce feeling was increaced. An unpleasant taste of Ile was little or not perceived. |

As shown in Table 1, Test Sample 1 having low contents of potassium, proline, and isoleucine exhibited no unpleasant taste of potassium but had a light salty taste and was watery. Test Sample 2 prepared by adding potassium chloride had an increased salty taste, but also had an unpleasant taste of potassium and a decreased soy sauce feeling. Test Sample 3 having lower contents of potassium and isoleucine than that defined by the present invention had a salty taste lasting moderately prolonged, but had a mild first taste and was still not enough in taste. Test Sample 4 having lower contents of potassium and proline than that defined by the present invention had a sharp salty taste that was moderately increased but vanished soon, and also had an unpleasant taste of isoleucine including a harsh taste and a bitter tastes. Taste samples 7, 9, and 10 having contents of potassium, isoleucine, and proline at least one of which was lower than that defined by the present invention did not fully achieve sufficient effects in all respects of salty taste, soy sauce feeling, and unpleasant taste. Addition of methionine tended to impart a rich after-taste (Test Samples 5 and 8). Addition of an acidic amino acid enhanced a salty taste and reduced an unpleasant taste of potassium, but not increased a soy sauce feeling (Test Sample 6).

In contrast, Test Sample 11 had an increased salty taste than that of Test Sample 1 and an increased soy sauce feeling than that of Test Sample 2, while having a decreased unpleasant taste of potassium. Addition of methionine to Test Sample 11 further decreased an unpleasant taste of methionine and imparted a rich taste and prolonged a salty taste (Test Sample 12). Increasing contents of isoleucine and methionine increased a soy sauce feeling and a salty taste and decreased an unpleasant taste of isoleucine, resulting in a more favorable general taste (Test Samples 13 and 14).

As described above, it was shown that a soy sauce-containing seasoning having contents of sodium, potassium, proline, and isoleucine each within the range defined by the present invention had an increased salty taste while a reduced unpleasant taste of potassium, and was imparted with a soy sauce feeling, resulting in a good general taste. Addition of methionine further decreased an unpleasant taste of isoleucine and imparted a rich taste, resulting in a more favorable general taste.

(2) Test Samples 1', 2', 6', and 11' to 14'

Considering that Test Samples 1, 2, 6, and 11 to 14 prepared in Example (1) are used in cooking or the like, these Test Samples were diluted 5-fold with water (1 part by mass of Test Sample+4 parts by mass of water) to prepare Test Samples 1', 2', 6', and 11' to 14' corresponding to respective Test Samples. These were subjected to a sensory evaluation for taste. Results are shown in Table 2.

TABLE 2

| Taste evaluation (1/5 dilution) | Test sample 1' | Test sample 2' | Test sample 6' | Test sample 11' | Test sample 12' | Test sample 13' | Test sample 14' |
|---|---|---|---|---|---|---|---|
| Comments | A salty taste was very bland. This sample had not enough taste. It had a soy sauce feeling. | A salty taste was moderately increased than that of Test sample 1'. This sample had a largely reduced soy sauce feeling. | A salty taste was moderately stronger than that of Test sample 2'. This sample had a mild first taste and not enough soy sauce feeling. This sample was sensitive to dilution. | A salty tasye was moderately stronger than that of Test sample 2'. This sample had a soy sauce feeling. Tastes were harmonized and moderately lasting. | A salty taste was stronger than that of Test sample 2'. This sample had a strong soy sauce feeling. Tastes were harmonized and lasting. This sample had a richer taste than that of Test sample 11'. | A salty taste was stronger than that of Test sample 2' and lasting. This sample had a strong soy sauce feeling. Tastes were harmonized and lasting long. This sample had a richer taste than that of Test sample 12'. | A salty taste was increased than that of Test sample 2' and lasting. Long. This sample had a strong soy sauce feeling. Tastes were harmonized and lasting long. This sample had a richer taste than that of Test sample 13'. |

As shown in Table 2, Test Sample 1' had a light salty taste and was very bland in taste. Test Sample 2' had a moderately increased salty taste but also a reduced brewed flavor unique to soy sauce, resulting in an unfavorable general taste. Test Sample 6' had a mild first taste and not so strong salty taste.

In contrast, Test Samples 11' to 14' had an increased salty taste than that of Test Sample 1' and an increased soy sauce feeling than that of Test Sample 2'. Tastes of these samples were harmonized and enriched to provide a favorable general taste. As described above, it was shown from a taste evaluation that Test Samples 1, 2, 6, and 11 to 14 were diluted 5-fold with water (Test Samples 1', 2', 6', 11' to 14') and those having contents of sodium, potassium, proline, and isoleucine within the range defined by the present invention before the dilution exhibited a good taste after the dilution. It was also found that the sample having a specific content of methionine exhibited a better taste when diluted.

(3) Test Samples 2 and 14 (for Tuna Sashimi)

Test Samples 2 and 14 prepared in Example (1) were used for sashimi and subjected to a taste evaluation. 1.2 g of a soy sauce-containing liquid seasoning (Test Sample 2 or 14) was applied to fillets of tuna purchased in a supermarket (12 g/fillet) and subjected to a sensory evaluation for taste.

Results showed that the tuna sashimi using Test Sample 2 exhibited a light salty taste and has a fishy smell. In contrast, the tuna sashimi using Test Sample 14 surely exhibited a salty taste and had a reduced fishy smell, resulting in a good general taste.

As described above, it was shown that sashimi with Test Sample 14 having contents of sodium, potassium, proline, and isoleucine each within the range defined by the present invention and further containing methionine in a preferred amount exhibited surely exhibited a salty taste although a low content of table salt and a decreased fishy smell of the sashimi, resulting in a good general taste.

(4) Test Samples 15 to 23

Each of packed soy sauce-containing liquid seasonings ("reduced-salt soy sauces", Test Samples 15 to 23) was prepared by placing reduced-salt soy sauce (Gen-en shoyu, Yamasa Corporation), sodium chloride (Wako Pure Chemical Industries, Ltd.), potassium chloride (Wako Pure Chemical Industries, Ltd.), L-proline (Wako Pure Chemical Industries, Ltd.), L-isoleucine (Wako Pure Chemical Industries, Ltd.), DL-methionine (Wako Pure Chemical Industries, Ltd.), L-leucine (Wako Pure Chemical Industries, Ltd.), L-histidine hydrochloride (Wako Pure Chemical Industries, Ltd.), and water in amounts shown in Table 3 in a stainless beaker and stirring the mixture. It was covered with an aluminum foil, heated for 10 minutes at 85° C. in a hot bath to dissolve the mixture and then cooled in water. It was transferred in a glass sample bottle (50 mL) and the bottle was capped.

Packed soy sauce-containing liquid seasonings were subjected to component analysis according to the method described above. Results are shown in Table 3. In Table 3, Leu refers leucine (the same applies to the following tables).

To evaluate a taste, these samples were also subjected to a sensory evaluation in the same way as in Example (1) (evaluated as was without dilution). Results are shown in Table 3. For a salty taste, Test Sample 15 was rated as rank d. For an unpleasant taste of potassium, Test Sample 15 was rated as rank a, and Test Sample 16 as rank d. For a soy sauce feeling, Test Sample 15 was rated as rank c. Based on these ratings, other Test Samples were evaluated relatively.

TABLE 3

| | | Test sample 15 | Test sample 16 | Test sample 17 | Test sample 18 | Test sample 19 | Test sample 20 | Test sample 21 | Test sample 22 | Test sample 23 |
|---|---|---|---|---|---|---|---|---|---|---|
| Component (% by mass) | Reduced-salt soy sauce | 85 | 85 | 85 | 85 | 85 | 85 | 85 | 85 | 85 |
| | Sodium chloride | 1 | 1 | 1 | 1 | 1 | 1 | 1 | 1 | 1 |
| | Potassium chloride | 0 | 3 | 7.5 | 3 | 3 | 3 | 3 | 3 | 3 |
| | L-proline | 0 | 0 | 0.05 | 0.01 | 0.05 | 0.15 | 0.15 | 0.15 | 0.15 |
| | L-isoleucine | 0 | 0 | 0 | 0 | 0 | 0 | 0.07 | 0.07 | 0.07 |
| | DL-methionine | 0 | 0 | 0 | 0 | 0 | 0 | 0 | 0.05 | 0.05 |
| | L-leucine | 0 | 0 | 0 | 0 | 0 | 0 | 0 | 0 | 0.05 |
| | L-hystidine hydrochloride | 0 | 0 | 0 | 0 | 0 | 0 | 0 | 0 | 0.07 |
| | Water | 14 | 11 | 6.45 | 10.99 | 10.95 | 10.85 | 10.78 | 10.73 | 10.61 |
| Content (% by mass) | Total | 100 | 100 | 100 | 100 | 100 | 100 | 100 | 100 | 100 |
| | Na | 3.162 | 3.162 | 3.162 | 3.162 | 3.162 | 3.162 | 3.162 | 3.162 | 3.162 |
| | K | 0.400 | 1.972 | 4.330 | 1.972 | 1.972 | 1.972 | 1.972 | 1.972 | 1.972 |
| | Pro | 0.273 | 0.273 | 0.323 | 0.283 | 0.323 | 0.423 | 0.423 | 0.423 | 0.423 |
| | Ile | 0.286 | 0.286 | 0.356 | 0.286 | 0.286 | 0.286 | 0.356 | 0.356 | 0.356 |
| | Met | 0.083 | 0.083 | 0.133 | 0.083 | 0.083 | 0.033 | 0.083 | 0.133 | 0.133 |
| | Leu | 0.455 | 0.455 | 0.505 | 0.455 | 0.455 | 0.455 | 0.455 | 0.455 | 0.505 |
| | Asp | 0.392 | 0.392 | 0.392 | 0.392 | 0.392 | 0.392 | 0.392 | 0.392 | 0.392 |
| | Glu | 0.768 | 0.768 | 0.768 | 0.768 | 0.768 | 0.768 | 0.768 | 0.768 | 0.768 |
| | Arg | 0.196 | 0.196 | 0.196 | 0.196 | 0.196 | 0.196 | 0.196 | 0.196 | 0.196 |
| | Lys | 0.258 | 0.258 | 0.258 | 0.258 | 0.258 | 0.258 | 0.258 | 0.258 | 0.258 |
| | His | 0.053 | 0.053 | 0.053 | 0.053 | 0.053 | 0.053 | 0.053 | 0.053 | 0.123 |
| | Ala | 0.304 | 0.304 | 0.304 | 0.304 | 0.304 | 0.304 | 0.304 | 0.304 | 0.304 |
| | K/Pro ratio | 1.464 | 7.227 | 13.406 | 6.968 | 6.105 | 4.662 | 4.662 | 4.662 | 4.662 |
| | Na/K ratio | 7.915 | 1.603 | 0.730 | 1.603 | 1.603 | 1.603 | 1.603 | 1.603 | 1.603 |
| | Pro/Ile ratio | 0.955 | 0.955 | 0.907 | 0.991 | 1.131 | 1.481 | 1.188 | 1.188 | 1.188 |
| | Met/Ile ratio | 0.292 | 0.292 | 0.374 | 0.292 | 0.292 | 0.292 | 0.233 | 0.374 | 0.374 |
| Test evaluation | Salty taste | d | c | b | b-c | b | b | a-b | a | a |
| | Unpleasant taste of potassium | a | d | c | b-c | b | a-b | a-b | a | a |
| | Soy sauce feeling | c | d | c | c | b-c | b | a-b | a | a |

TABLE 3-continued

| | Test sample 15 | Test sample 16 | Test sample 17 | Test sample 18 | Test sample 19 | Test sample 20 | Test sample 21 | Test sample 22 | Test sample 23 |
|---|---|---|---|---|---|---|---|---|---|
| Comments | A salty taste was light and rated as d. This sample had a watery, light and flat taste, which was not enough. An unpleasant taste of potassium was not perceived and rated as a. A soy sauce feeling was perceived and rated as c. | An unpleasant taste of potassium was perceived and rated as d. A salty taste was increased but a soy sauce feeling was reduced than that of Test sample 15. | This sample had an increased salty taste than that of Test sample 16, but also had an unpleasant taste of potassium. Tastes were weakly harmonized. | An unpleasant taste of potassium was decreased due to addition of Pro. Tastes were moderately harmonized. | A first taste was milder than that of Test sample 16 but a salty taste was lasting moderately long. A soy sauce feeling was moderately increased. An unpleasant taste of potassium was further decreased. | A first taste was milder than that of Test sample 16 but a salty taste was lasting long. A soy sauce feeling was increased. An unpleasant taste of potassium was further decreased. | A salty taste was sharper than that of Test sample 16. This sample was imparted with a soy sauce feeling. | An unpleasant taste of Ile was reduced due to addition of Met. Tastes were harmonized. A salty taste was lasting longer than that of Test sample 16. An after taste was lasting longer than that of Test sample 16. An after taste was lasting very longer. An unpleasant taste of potassium was not perceived | A soy sauce feeling was increased due to addition of Leu. A salty taste was stronger than that of Test sample 16. A peak of salty taste was in a middle to an after taste. An unpleasant taste of potassium was not perceived. Tastes were harmonized. |

As shown in Table 3, Test Sample 15 having low contents of potassium and proline exhibited no unpleasant taste of potassium but had a bland salty taste and a light flat general taste. Test Sample 16 having a lower content of praline than that defined by the present invention had an increased salty taste, but exhibited an unpleasant taste of potassium, and also had a decreased brewed flavor unique to soy sauce, resulting in an unfavorable general taste. Test Sample 17 containing a large amount of potassium while having a content of praline within the range defined by the present invention had a strong salty taste but also exhibited a strong unpleasant taste of potassium. Tastes of this sample were poorly harmonized.

Test Samples 18 to 23 had an increased salty taste than that of Test Samples 15 and 16 and a decreased unpleasant taste of potassium than that of Test Sample 16. An increasing content of praline increased a soy sauce feeling than that of Test Sample 16 and harmonized tastes to provide good general taste (Test Samples 18 to 20). A combined use of methionine allowed reduction of an unpleasant taste of isoleucine, prolongation of a taste lasting, and increase of a rich taste (Test Sample 22). Addition of leucine also enhanced a salty taste and a soy sauce feeling (Test Sample 23).

As described above, it was shown that a soy sauce-containing seasoning having contents of sodium, potassium, praline, and isoleucine each within the range defined by the present invention had an increased salty taste while a reduced unpleasant taste of potassium, and was imparted with a soy sauce feeling and harmonized tastes, resulting in a good general taste. Addition of methionine further decreased an unpleasant taste of isoleucine and imparted a rich taste, resulting in a more favorable general taste.

(5) Test Samples 15' to 23'

Considering that Test Samples 15 to 23 prepared in Example (4) are used in cooking or the like, these Test Samples were diluted 5-fold with water (1 part by mass of Test Sample+4 parts by mass of water) to prepare Test Samples 15' to 23' corresponding to respective Test Samples. These were subjected to a sensory evaluation for taste. Results are shown in Table 4.

TABLE 4

| Taste evaluation (1/5 dilution) | Test sample 15' | Test sample 16' | Test sample 17' | Test sample 18' | Test sample 19' |
|---|---|---|---|---|---|
| Comments | A salty taste was very bland. A general taste was not enough. This sample had a soy sauce feeling. | A salty taste was moderately increased than that of Test sample 15'. A soy sauce feeling was reduced. An unusual taste of potassium was perceived. Tastes were not harmonized. | An unpleasant taste of potassium was stronger than that of Test sample 16' and lasting long. Tastes were moderately harmonized. | An unpleasant taste of potassium was decreased than that of Test sample 16'. Tastes were moderately harmonized. | An unpleasant taste of potassium was decreased than that of Test sample 17'. Tastes were moderately harmonized. This sample had a moderate soy sauce feeling. |

| Taste evaluation (1/5 dilution) | Test sample 20' | Test sample 21' | Test sample 22' | Test sample 23' |
|---|---|---|---|---|
| Comments | An unpleasant taste of potassium was little or not perceived. Tastes were harmonized. This sample had a soy sauce feeling. | An unpleasant taste of potassium was little or not perceived. Tastes were harmonized. This sample had a strong soy sauce feeling. | An unpleasant taste of potassium was not perceived. Tastes were harmonized. This sample had a strong soy sauce feeling. A salty taste was excessively strong. An unpleasant taste of Ile was not perceived. This sample had a richer taste than that of Test sample 21'. | An unpleasant taste of potassium was not perceived. Tastes were harmonized. This sample had a strong soy sauce feeling. A salty taste was excessively strong. An unpleasant taste of Ile was not perceived. This sample had a richer taste than that of Test sample 21'. |

As shown in Table 4, Test Sample 15' had a bland salty taste and a very light flat general taste. Test Sample 16' had a moderately increased salty taste but also a reduced brewed flavor unique to soy sauce, resulting in an unfavorable general taste. Test Sample 17' had a further increased salty taste but a strong unpleasant taste of potassium lasting.

In contrast, Test Samples 18' to 23' had an increased salty taste than that of Test Samples 15' and 16' and an increased soy sauce feeling than that of Test Sample 16'. Tastes of these samples were harmonized to provide a favorable general taste. A soy sauce feeling and a salty taste increased as isoleucine content increased. An increasing content of methionine enhanced a rich taste.

As described above, it was shown from a taste evaluation that Test Samples 15 to 23 were diluted 5-fold with water (Test Samples 15' to 23'), those having contents of sodium, potassium, proline, and isoleucine within the range defined by the present invention before the dilution exhibited good tastes after the dilution. It was also found that the sample having a specific content of methionine exhibited a better taste when diluted.

(6) Test Samples 16 and 22 (for Tuna Sashimi)

Test Samples 16 and 22 prepared in Example (4) were used for a taste evaluation wth sashimi. 1.2 g of a soy sauce-containing liquid seasoning (Test Sample 16 or 22) was applied to fillets of tuna purchased in a supermarket (12 g/fillet) and subjected to a sensory evaluation for taste.

Results showed that the tuna sashimi using Test Sample 16 exhibited a salty taste not enough and had a fishy smell. In contrast, the tuna sashimi using Test Sample 22 exhibited a strong salty taste and had a reduced fishy smell, resulting in a good taste. As described above, it was shown that sashimi with Test Sample 22 having contents of sodium, potassium, proline, and isoleucine each within the range defined by the present invention and further containing methionine in a preferred amount surely exhibited a salty taste although a low content of table salt and a decreased fishy smell of the sashimi, resulting in a good general taste.

(7) Test Samples 24 to 29

Each of packed soy sauce-containing liquid seasonings ("low-salt soy sauces", Test Samples 24 to 29) was prepared by placing soy sauce (Tokusen marudaizu shoyu, Kikkoman Corporation), reduced-salt soy sauce (Gen-en shoyu, Yamasa Corporation), potassium chloride (Wako Pure Chemical Industries, Ltd.), L-proline (Wako Pure Chemical Industries, Ltd.), L-isoleucine (Wako Pure Chemical Industries, Ltd.), L-leucine (Wako Pure Chemical Industries, Ltd.), DL-methionine (Wako Pure Chemical Industries, Ltd.), L-histidine hydrochloride (Wako Pure Chemical Industries, Ltd.), and water in amounts shown in Table 5 in a stainless beaker and the mixture was stirred. The beaker was covered with an aluminum foil, heated for 10 minutes at 90° C. in a hot bath to dissolve the mixture and cooled in water. It was transferred in a PET container (350 mL) and capped.

Packed soy sauce-containing liquid seasonings were subjected to component analysis according to the method described above. Results are shown in Table 5.

To evaluate a taste, these samples were also subjected to a sensory evaluation in the same way as in Example (1). Results are shown in Table 5. For a salty taste, Test Sample 24 was rated as rank d. For an unpleasant taste of potassium, Test Sample 24 was rated as rank a, and Test Sample 25 as rank c. For a soy sauce feeling, Test Sample 24 was rated as rank c. Based on these ratings, other Test Samples were evaluated relatively.

TABLE 5

|  |  | Test sample 24 | Test sample 25 | Test sample 26 | Test sample 27 | Test sample 28 | Test sample 29 |
| --- | --- | --- | --- | --- | --- | --- | --- |
| Component (% by mass) | Reduced-salt soy sauce | 40 | 40 | 40 | 40 | 40 | 40 |
|  | Soy sauce | 45 | 45 | 45 | 45 | 45 | 45 |
|  | Potassium chloride | 0 | 3 | 3 | 3 | 3 | 3 |
|  | L-proline | 0 | 0 | 0.1 | 0.1 | 0.1 | 0.15 |
|  | L-isoleucine | 0 | 0 | 0 | 0.05 | 0.05 | 0.08 |
|  | DL-methyonine | 0 | 0 | 0 | 0 | 0.04 | 0.04 |
|  | L-leucine | 0 | 0 | 0 | 0 | 0.03 | 0 |
|  | L-hystidine hydrochloride | 0 | 0 | 0 | 0 | 0 | 0.05 |
|  | Water | 15 | 12 | 11.9 | 11.85 | 11.78 | 11.68 |
|  | Total | 100 | 100 | 100 | 100 | 100 | 100 |
| Content (% by mass) | Na | 3.778 | 3.778 | 3.778 | 3.778 | 3.778 | 3.778 |
|  | K | 0.377 | 1.949 | 1.949 | 1.949 | 1.949 | 1.949 |
|  | Pro | 0.267 | 0.267 | 0.367 | 0.367 | 0.367 | 0.417 |
|  | Ile | 0.283 | 0.283 | 0.283 | 0.333 | 0.333 | 0.363 |
|  | Met | 0.082 | 0.082 | 0.082 | 0.082 | 0.122 | 0.122 |
|  | Leu | 0.450 | 0.450 | 0.450 | 0.450 | 0.480 | 0.450 |
|  | Asp | 0.247 | 0.247 | 0.247 | 0.247 | 0.247 | 0.247 |
|  | Glu | 0.690 | 0.690 | 0.690 | 0.690 | 0.690 | 0.690 |
|  | Arg | 0.274 | 0.274 | 0.274 | 0.274 | 0.274 | 0.274 |
|  | Lys | 0.261 | 0.261 | 0.261 | 0.261 | 0.261 | 0.261 |
|  | His | 0.073 | 0.073 | 0.073 | 0.073 | 0.073 | 0.123 |
|  | Ala | 0.409 | 0.409 | 0.409 | 0.409 | 0.409 | 0.409 |
|  | K/Pro ratio | 1.412 | 7.300 | 5.311 | 5.311 | 5.311 | 4.674 |
|  | Na/K ratio | 10.021 | 1.938 | 1.938 | 1.938 | 1.938 | 1.938 |
|  | Pro/Ile ratio | 0.943 | 0.943 | 1.297 | 1.102 | 1.102 | 1.149 |
|  | Met/Ile ratio | 0.290 | 0.290 | 0.290 | 0.246 | 0.366 | 0.336 |
| Taste evaluation | Salty taste | d | b | b | a-b | a-b | a |
|  | Unpleasant taste of potassium | a | c | b | a-b | a | a |
|  | Soy sauce feeling | c | d | b | a-b | a | a |
|  | Comments | A salty taste was rated as d. An unpleasant taste of potassium was rated as a. A soy sauce feeling was rated as c. | An unpleasant taste of potassium was moderately perceived and rated as c. A salty taste was increased but a soy saue feeling was reduced than that of Test sample 24. | A salty taste was perceived. An unpleasant taste of potassium was weak. A soy sauce feeling was increased than that of Test eample 25. Tastes were moderately harmonized. | A salty taste was strong. An unpleasant taste of potassium was not perceived. A soy sauce feeling was increased than that of Test sample 25. Tastes were harmonized. | A salty taste was strong. An unpleasant taste of potassium was not perceived. A soy sauce feeling was increased than that of Test sample 25. Tastes were harmonized. This sample had a rich taste. An unpleasant taste of Ile was not perceived. | A salty taste was very strong and lasting long. An unpleasant taste of potassium was not perceived. A soy sauce feelinh was increased than that of Test sample 25. Tastes were harmonized. This sample had a rich taste. An unpleasant taste of Ile was not perceived |

As shown in Table 5, Test Sample 24 having a lower content of potassium than that defined by the present invention exhibited no unpleasant taste of potassium but had a bland salty taste and a light flat general taste. Test Sample 25 having a lower content of proline than that defined by the present invention had an increased salty taste, but exhibited an unpleasant taste of potassium, resulting in an unfavorable general taste.

In contrast, Test Samples 26 to 29 each had an increased salty taste than that of Test Samples 24 and 25 and a decreased unpleasant taste of potassium than that of Test Sample 25. Test Samples 26 to 29 had a strong soy sauce feeling and an increased rich taste, resulting in a favorable general taste.

As described above, it was shown that a low-salt soy sauce having contents of sodium, potassium, proline, and isoleucine each within the range defined by the present invention had an increased salty taste while a reduced unpleasant taste of potassium, and was imparted with a soy sauce feeling and a rich feeling, resulting in a good general taste. Addition of methionine further allowed reduction of an unpleasant taste of isoleucine and imparted a rich taste, resulting in a more favorable general taste.

(8) Test Samples 24' to 29'

Considering that Test Samples 24 to 29 prepared in Example (7) are used in cooking or the like, these test samples were diluted 5-fold with water (1 part by mass of test sample+4 parts by mass of water) to prepare Test Samples 24' to 29' corresponding to respective Test Samples. These were subjected to a sensory evaluation for taste. Results are shown in Table 6.

good tastes after dilution. It was also found that the sample having a specific content of methionine exhibited a better taste when diluted.

(9) Test Samples 25 and 29 (Tuna Sashimi)

Test Samples 25 and 29 prepared in Example (7) were used for a taste evaluation wth sashimi. 1.2 g of a soy sauce-containing liquid seasoning (Test Sample 25 or 29) was applied to fillets of tuna purchased in a supermarket (12 g/fillet) and subjected to a sensory evaluation for taste.

Results showed that the tuna sashimi using Test Sample 25 exhibited a moderately weak salty taste and had a fishy smell. In contrast, the tuna sashimi using Test Sample 29 exhibited a strong salty taste and had a reduced fishy smell, resulting in a good general taste.

As described above, it was shown that sashimi with Test Sample 29 having contents of sodium, potassium, proline, and isoleucine each within the range defined by the present invention and further containing methionine in a preferred amount surely exhibited a salty taste although a low content of table salt and a decreased fishy smell of the sashimi, resulting in a good general taste.

(10) Test Samples 30 to 33

Each of packed soy sauce-containing liquid seasonings ("low-salt soy sauces", Test Samples 30 to 33) was prepared by placing reduced-salt soy sauce (Tokusen marudaizu genen shoyu, Kikkoman Corporation), potassium chloride (Wako Pure Chemical Industries, Ltd.), L-proline (Wako Pure Chemical Industries, Ltd.), L-isoleucine (Wako Pure Chemical Industries, Ltd.), L-leucine (Wako Pure Chemical Industries, Ltd.), DL-methionine (Wako Pure Chemical Industries,

TABLE 6

| Taste evaluation (1/5 dilution) | Test sample 24' | Test sample 25' | Test sample 26' | Test sample 27' | Test sample 28' | Test sample 29' |
| --- | --- | --- | --- | --- | --- | --- |
| Comments | A salty taste was bland. A general taste was not enough. This sample had a soy sauce feeling. | A salty taste was moderately increased than that of Test sample 24'. A soy sauce feeling was reduced. Tastes were not harmonized. | A salty taste was increased than that of Test sample 24'. Tastes were harmonized. This sample had a soy sauce feeling. | A salty taste was increased than thet of Test sample 24'. Tastes were harmonized. This sample had a strong soy sauce feeling. | A salty taste was increased than that of Test sample 24'. Tastes were harmonized. This sample had a very strong soy sauce feeling and had a richer taste than that of Test sample 27. | A salty taste was increased than that of Test sample 24'. Tastes were harmonized. This sample had a very strong soy sauce feeling and had a richer taste than that of Test sample 27'. |

As shown in Table 6, Test Sample 24' had a bland salty taste and was not enough in taste. Test Sample 25' had a reduced brewed flavor unique to soy sauce, resulting in an unfavorable general taste.

In contrast, Test Samples 26' to 29' had an increased soy sauce feeling than that of Test Samples 24' and 25'. Tastes of these samples were harmonized and enriched to provide a favorable general taste. A soy sauce feeling and a salty taste increased as an isoleucine content increased. An increasing content of methionine enhanced a rich taste.

As described above, it was shown from a taste evaluation that among Test Samples 24 to 29 diluted 5-fold with water (Test Samples 24' to 29'), those having contents of sodium, potassium, proline, and isoleucine each within the range defined by the present invention before dilution exhibited Ltd.), L-phenylalanine (Wako Pure Chemical Industries, Ltd.), and water in amounts shown in Table 7 in a stainless beaker and the mixture was stirred. It was covered with an aluminum foil, heated for 10 minutes at 95° C. in a hot bath to dissolve the mixture and transferred in an amount of 350 g in a PET container (350 mL), then capped and cooled in water.

Packed soy sauce-containing liquid seasonings were subjected to component analysis according to the method described above. Results are shown in Table 7.

To evaluate a taste, these samples were also subjected to a sensory evaluation in the same way as in Example (1). Results are shown in Table 7. For a salty taste, Test Sample 30 was rated as rank d. For an unpleasant taste of potassium, Test Sample 30 was rated as rank a, and Test Sample 31 as rank c. For a soy sauce feeling, Test Sample 31 was rated as rank c. Based on these ratings, other Test Samples were evaluated relatively.

TABLE 7

|  |  | Test Example 30 | Text sample 31 | Test sample 32 | Test sample 33 |
|---|---|---|---|---|---|
| Component (% by mass) | Reduced-salt soy sauce | 79.4 | 79.4 | 79.4 | 79.4 |
|  | Sodium chloride | 0.6 | 0.6 | 0.6 | 0.6 |
|  | Potassium chloride | 0 | 3 | 3 | 3 |
|  | L-proline | 0 | 0 | 0.09 | 0.12 |
|  | L-isoleucine | 0 | 0 | 0.04 | 0.04 |
|  | DL-methyonine | 0 | 0 | 0.04 | 0.04 |
|  | L-leucine | 0 | 0 | 0.03 | 0.03 |
|  | L-phenylalanine | 0 | 0 | 0 | 0.1 |
|  | Water | 20 | 17 | 16.8 | 16.67 |
|  | Total | 100 | 100 | 100 | 100 |
| Content (% by mass) | Na | 2.785 | 2.785 | 2.785 | 2.785 |
|  | K | 0.169 | 1.742 | 1.742 | 1.742 |
|  | Pro | 0.273 | 0.273 | 0.363 | 0.393 |
|  | Ile | 0.284 | 0.284 | 0.324 | 0.324 |
|  | Met | 0.083 | 0.083 | 0.123 | 0.123 |
|  | Leu | 0.450 | 0.450 | 0.480 | 0.480 |
|  | Asp | 0.118 | 0.118 | 0.118 | 0.118 |
|  | Glu | 0.622 | 0.622 | 0.622 | 0.622 |
|  | Arg | 0.345 | 0.345 | 0.345 | 0.345 |
|  | Lys | 0.263 | 0.263 | 0.263 | 0.263 |
|  | His | 0.097 | 0.097 | 0.097 | 0.097 |
|  | Ala | 0.490 | 0.490 | 0.490 | 0.490 |
|  | Phe | 0.283 | 0.283 | 0.283 | 0.383 |
|  | K/Pro ratio | 0.619 | 6.379 | 4.669 | 4.669 |
|  | Na/K ratio | 16.477 | 1.599 | 1.599 | 1.599 |
|  | Pro/Ile ratio | 0.961 | 0.961 | 1.151 | 1.151 |
|  | Met/Ile ratio | 0.293 | 0.293 | 0.378 | 0.378 |
| Taste evaluation | Salty taste | d | c | a-b | a |
|  | Unpleasant taste of potassium | a | c | a | a |
|  | Soy sauce feeling | c | c-d | a-b | a |
|  | Comments | A salty taste was light and rated as d. This sample had a watery and light flat general taste, and was not enough. An unpleasant taste of K was not perceived and rated as a. A soy sauce feeling was perceived and rated as c. | An unpleasant taste of potassium was perceived and rated as c. A salty taste was increased but a soy sauce feeling was redced than that of Test sample 30. | This sample had a salty taste, a soy sauce feeling, and a harmonized general taste, which were enhanced than that of Test sample 31. An unpleasant taste of K was not perceived. | This sample had a salty taste, a soy sauce feeling, and a harmonized general taste, which were largely enhanced than that of Test sample 31. An unpleasant taste of potassium was not perceived. |

As shown in Table 7, Test Sample 30 having a lower content of potassium than that defined by the present invention exhibited no unpleasant taste of potassium but had a bland salty taste and a light flat general taste. Test Sample 31 having a lower content of proline than that defined by the present invention had an increased salty taste, but exhibited an unpleasant taste of potassium, resulting in an unfavorable general taste.

In contrast, Test Samples 32 and 33 had an increased salty taste than that of Test Samples 30 and 31 and a decreased unpleasant taste of potassium than that of Test Sample 31. Test Samples 32 and 33 had a strong soy sauce feeling and an enhanced rich feeling, resulting in a favorable general taste.

As described above, it was shown that a low-salt soy sauce having contents of sodium, potassium, proline, and isoleucine each within the range defined by the present invention had an increased salty taste while a reduced unpleasant taste of potassium, and was imparted with a soy sauce feeling and a rich feeling, resulting in a good general taste. Addition of methionine further allowed reduction of an unpleasant taste of isoleucine and imparted a rich taste, resulting in a more favorable general taste. It was also shown that addition of phenylalanine further decreased the unpleasant taste and enhanced a salty taste, a soy sauce feeling, and a rich feeling, resulting in a more favorable general taste.

(11) Test Samples 30' to 33'

Considering that Test Samples 30 to 33 prepared in Example (10) are used in cooking or the like, these Test Samples were diluted 5-fold with water (1 part by mass of Test Sample+4 parts by mass of water) to prepare Test Samples 30' to 33' corresponding to respective Test Samples. These were subjected to a sensory evaluation for taste. Results are shown in Table 8.

TABLE 8

| Taste evaluation (1/5 dilution) | Test sample 30' | Test sample 31' | Test sample 32' | Test sample 33' |
|---|---|---|---|---|
| Comments | A salty taste was very bland. This sample was not enough in taste. A soy sauce feeling was perceived. | A salty taste was moderately increased than that of Test sample 30'. A soy sauce feeling was reduced. An unpleasant taste of K was perceived. Tastes were not harmonized. | An unpleasant taste of K was reduced. Tastes were harmonized. This sample had a strong soy sauce feeling and a rich taste. | An unpleasant taste of K was reduced. Tastes were well harmonized. This sample had a strong soy sauce feeling. A salty taste was excessively sharp. This sample had a rich taste. |

As shown in Table 8, Test Sample 30' had a bland salty taste and was not enough in taste. Test Sample 31' had a reduced brewed flavor unique to soy sauce, resulting in an unfavorable general taste.

In contrast, Test Samples 32' and 33' had an increased soy sauce feeling than that of Test Samples 30' and 31'. Tastes of these samples were enriched and harmonized to provide a good general taste.

As described above, it was shown from the taste evaluation that Test Samples 30 to 33 diluted 5-fold with water (Test Samples 30' to 33') were evaluated and those having contents of sodium, potassium, proline, and isoleucine within the ranges defined by the present invention before the dilution exhibited a good taste after the dilution.

(12) Test Samples 31 to 33 (Tuna Sashimi)

Test Samples 31 to 33 prepared in Example (10) were used for a taste evaluation with sashimi. 1.2 g of a soy sauce-containing liquid seasoning (Test Sample 31 to 33) was applied to fillets of tuna purchased in a supermarket (12 g/fillet) and subjected to a sensory evaluation for taste.

Results showed that the tuna sashimi using Test Sample 31 exhibited a moderately light salty taste and had a fishy smell. In contrast, the tuna sashimi using Test Sample 32 exhibited a strong salty taste and had a reduced a fishy smell, resulting in a good general taste. Test Sample 33 on a fillet exhibited a very strong salty taste and further reduced a fishy smell of tuna, resulting in a good general taste.

As described above, it was shown that sashimi with Test Sample 32 having contents of sodium, potassium, praline, and isoleucine within the ranges defined by the present invention surely exhibited a salty taste, although a low content of table salt, a decreased fishy smell of sashimi, resulting in a good general taste. It was also shown that sashimi with Test Sample 33 further containing methionine in a preferred amount exhibited a better taste than that of Test Sample 32.

The invention claimed is:

1. A packed soy sauce-containing liquid seasoning, comprising the following components (A), (B), (C), and (D):

| (A) sodium | 2.7 to 5.1% by mass |
| (B) potassium | 0.8 to 4% by mass |
| (C) proline | 0.28 to 1% by mass |
| (D) isoleucine | 0.2 to 1% by mass. | wherein a mass ratio of the potassium (B) to the proline (C) is from 4 to 6.5.

2. The packed soy sauce-containing liquid seasoning according to claim 1, which is a soy sauce, a processed soy sauce, a soup stock, or a dipping sauce.

3. The packed soy sauce-containing liquid seasoning according to claim 1, wherein the acidic amino acid content is less than 2%.

4. The packed soy sauce-containing liquid seasoning according to claim 1, wherein the basic amino acid content is less than 1%.

5. The packed soy sauce-containing liquid seasoning according to claim 1, wherein the content of proline is from 0.28 to 0.5% by mass.

6. The packed soy sauce-containing liquid seasoning according to claim 1, wherein the content of proline is from 0.28 to 0.7% by mass.

7. The packed soy sauce-containing liquid seasoning according to claim 1, wherein the content of proline is from 0.28 to 0.7% by mass.

8. The packed soy sauce-containing liquid seasoning according to claim 1, further comprising (E) from 0.07 to 0.5% by mass of methionine.

9. The packed soy sauce-containing liquid seasoning according to claim 8, wherein an acidic amino acid content is less than 2% or a basic amino acid content is less than 1%.

10. The packed soy sauce-containing liquid seasoning according to claim 8, wherein a mass ratio of sodium (A)/potassium (B) is from 1.0 to about 3.4.

11. The packed soy sauce-containing liquid seasoning according to claim 8, which is a soy sauce, a processed soy sauce, a soup stock, or a dipping sauce.

12. The packed soy sauce-containing liquid seasoning according to claim 1, wherein an acidic amino acid content is less than 2% or a basic amino acid content is less than 1%.

13. The packed soy sauce-containing liquid seasoning according to claim 12, wherein a mass ratio of sodium (A)/potassium (B) is from 1.0 to about 3.4.

14. The packed soy sauce-containing liquid seasoning according to claim 12, which is a soy sauce, a processed soy sauce, a soup stock, or a dipping sauce.

15. The packed soy sauce-containing liquid seasoning according to claim 1, wherein a mass ratio of sodium (A)/potassium (B) is from 1.0 to about 3.4.

16. The packed soy sauce-containing liquid seasoning according to claim 15, which is a soy sauce, a processed soy sauce, a soup stock, or a dipping sauce.

17. A packed soy sauce-containing liquid seasoning, comprising the following components (A), (B), (C), and (D):

| (A) sodium | 2.7 to 5.1% by mass |
| (B) potassium | 0.8 to 4% by mass |
| (C) proline | 0.28 to 1% by mass |
| (D) isoleucine | 0.2 to 1% by mass. | wherein a mass ratio of the potassium (B) to the proline (C) is from 4 to 6.5.

18. The packed soy sauce-containing liquid seasoning according to claim 17, wherein the content of proline is from 0.28 to 0.5% by mass.

* * * * *